US008676860B2

(12) United States Patent
Dettinger et al.

(10) Patent No.: US 8,676,860 B2
(45) Date of Patent: *Mar. 18, 2014

(54) WEB SERVICE DISCOVERY VIA DATA ABSTRACTION MODEL

(75) Inventors: Richard D. Dettinger, Rochester, MN (US); Frederick A. Kulack, Rochester, MN (US); Kevin G. Paterson, San Antonio, TX (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,604

(22) Filed: May 29, 2012

(65) Prior Publication Data

US 2012/0233195 A1 Sep. 13, 2012

Related U.S. Application Data

(63) Continuation of application No. 12/771,288, filed on Apr. 30, 2010, now Pat. No. 8,250,113.

(51) Int. Cl.
 *G06F 17/30* (2006.01)
 *G06F 17/00* (2006.01)
(52) U.S. Cl.
 USPC .......................................... 707/802; 707/769
(58) Field of Classification Search
 None
 See application file for complete search history.

(56) References Cited

U.S. PATENT DOCUMENTS

| | | | |
|---|---|---|---|
| 5,933,145 A | 8/1999 | Meek | |
| 6,012,053 A | 1/2000 | Pant et al. | |
| 6,928,431 B2 | 8/2005 | Dettinger et al. | |
| 6,947,928 B2 | 9/2005 | Dettinger et al. | |
| 6,954,748 B2 | 10/2005 | Dettinger et al. | |
| 6,996,558 B2 | 2/2006 | Dettinger et al. | |
| 7,085,756 B2 | 8/2006 | Carey et al. | |
| 7,096,229 B2 | 8/2006 | Dettinger et al. | |
| 7,428,582 B2 | 9/2008 | Bean et al. | |
| 7,627,671 B1 | 12/2009 | Palma et al. | |
| 7,836,071 B2 | 11/2010 | Glowacki et al. | |
| 8,250,113 B2 | 8/2012 | Dettinger et al. | |
| 8,275,806 B2 | 9/2012 | Dettinger et al. | |
| 8,321,451 B2 | 11/2012 | Dettinger et al. | |
| 2002/0165877 A1 | 11/2002 | Malcolm et al. | |
| 2003/0088554 A1 | 5/2003 | Ryan et al. | |

(Continued)

OTHER PUBLICATIONS http://en.wikipedia.org/wiki/Service-oriented.sub.—Architecture, "Service-Oriented Architecture", Apr. 21, 2008, 14 pages.

(Continued)

*Primary Examiner* — Tarek Chbouki
(74) *Attorney, Agent, or Firm* — Toler Law Group

(57) ABSTRACT

A method includes querying a discovery registry associated with a data abstraction model of a database to discover one or more web services that are resolvable based on a particular logical field selected via a database query interface. The data abstraction model includes a plurality of logical fields that each correspond to a particular data structure of the database. A web service input of a discovered web service is associated with a first logical field of the data abstraction model via the discovery registry, and a web service output of the discovered web service is associated with a second logical field of the data abstraction model via the discovery registry. A modified database query interface includes a text entry element to receive a text search term and a first selectable input associated with the first discovered web service.

20 Claims, 6 Drawing Sheets

(56) References Cited

U.S. PATENT DOCUMENTS

| | | | |
|---|---|---|---|
| 2003/0208458 A1* | 11/2003 | Dettinger et al. | 707/1 |
| 2003/0220893 A1 | 11/2003 | Dettinger et al. | |
| 2004/0078424 A1 | 4/2004 | Yairi et al. | |
| 2004/0225513 A1* | 11/2004 | Haeberle et al. | 705/1 |
| 2004/0260761 A1 | 12/2004 | Leaute et al. | |
| 2005/0138173 A1 | 6/2005 | Ha et al. | |
| 2005/0234873 A1* | 10/2005 | Milligan et al. | 707/3 |
| 2006/0015843 A1* | 1/2006 | Sabbouh | 717/106 |
| 2006/0053120 A1 | 3/2006 | Shum et al. | |
| 2006/0129549 A1 | 6/2006 | Bozak et al. | |
| 2006/0136469 A1 | 6/2006 | Dettinger et al. | |
| 2006/0190580 A1 | 8/2006 | Shu et al. | |
| 2007/0027715 A1 | 2/2007 | Gropper et al. | |
| 2007/0033590 A1 | 2/2007 | Masuouka et al. | |
| 2007/0233457 A1 | 10/2007 | Kang et al. | |
| 2008/0215612 A1 | 9/2008 | Dettinger et al. | |
| 2008/0250006 A1 | 10/2008 | Dettinger et al. | |
| 2008/0288235 A1 | 11/2008 | Dettinger et al. | |
| 2009/0058237 A1 | 3/2009 | Bally et al. | |
| 2009/0080408 A1 | 3/2009 | Natoli et al. | |
| 2009/0100004 A1 | 4/2009 | Andrei et al. | |
| 2009/0132456 A1* | 5/2009 | Dettinger et al. | 706/47 |
| 2009/0138456 A1 | 5/2009 | Dettinger et al. | |
| 2009/0158237 A1 | 6/2009 | Zhang et al. | |
| 2009/0249290 A1 | 10/2009 | Jenkins et al. | |
| 2010/0070448 A1 | 3/2010 | Omoigui | |
| 2011/0208848 A1 | 8/2011 | Feng et al. | |
| 2011/0270817 A1 | 11/2011 | Dettinger et al. | |
| 2011/0270842 A1 | 11/2011 | Dettinger et al. | |
| 2011/0270870 A1 | 11/2011 | Dettinger et al. | |
| 2012/0221598 A1 | 8/2012 | Dettinger et al. | |
| 2012/0272643 A1 | 11/2012 | Sherlock | |
| 2012/0278311 A1 | 11/2012 | Dettinger et al. | |

OTHER PUBLICATIONS

U.S. Appl. No. 12/771,288; Non-Final Office Action dated Dec. 29, 2011; 20 pages.
U.S. Appl. No. 12/771,288; Notice of Allowance dated Apr. 12, 2012, 9 pages.
U.S. Appl. No. 12/771,535; Non-Final Office Action dated Feb. 16, 2012, 21 pages.
U.S. Appl. No. 12/771,535; Notice of Allowance dated Jul. 18, 2012, 10 pages.
U.S. Appl. No. 12/771,636; Final Office Action dated Dec. 19, 2012; 25 pages.
U.S. Appl. No. 12/771,636; Non-Final Office Action dated Jun. 8, 2012, 33 pages.
U.S. Appl. No. 12/771,707; Non-Final Office Action dated Jan. 5, 2012, 15 pages.
U.S. Appl. No. 12/771,707; Notice of Allowance dated May 10, 2013; 9 pages.
U.S. Appl. No. 12/771,760; Non-Final Office Action dated Jan. 4, 2012; 12 pages.
U.S. Appl. No. 12/771,760; Notice of Allowance dated May 24, 2012, 10 pages.
U.S. Appl. No. 13/460,676; Non-Final Office Action dated Feb. 6, 2013; 16 pages.
U.S. Appl. No. 13/460,736; Non-Final Office Action dated Feb. 22, 2013; 12 pages.
Zahreddine et al., "A Framework for Automatic and Dynamic Composition of Personalized Web Services", Proceedings of the 19th International Conference on Advanced Information Networking and Applications (AINA'05) 1550-445X/05 2005 IEEE, Mar. 28-30, 2005, 6 pages.
U.S. Appl. No. 13/460,736; Final Office Action dated Jul. 26, 2013; 7 pages.

* cited by examiner

WEB SERVICE DISCOVERY VIA DATA ABSTRACTION MODEL

I. CLAIM OF PRIORITY

This application is a continuation patent application of and claims priority from, U.S. patent application Ser. No. 12/771,288, filed on Apr. 30, 2010, and entitled "WEB SERVICE DISCOVERY VIA DATA ABSTRACTION MODEL," which is incorporated by reference herein in its entirety for all purposes.

II. FIELD OF THE DISCLOSURE

The present disclosure relates generally to computer implemented data processing, and more particularly, to accessing computer data and resources.

III. BACKGROUND

Advances in computing enable tremendous access to desired information and resources. Databases provide computerized information storage and retrieval for this purpose. In a computer database management system (DBMS), a requesting entity (e.g., an application, an operating system, or a user) requests access to a specified database by issuing a database access request. Such requests may include, for instance, simple catalog lookup requests or transactions that operate to read, change, or add specified records in the database. These requests are made using high-level query languages. The term query denominates a set of commands for retrieving data from a stored database. Queries take the form of a command language that lets programmers and programs select data, insert data, update data, locate data, and so forth.

A data abstraction model is a programmatic framework, developed to provide a requesting entity (e.g., an end-user or application) with an abstract representation of physical data. An abstract data model logically describes an underlying physical data structure. In this way, the requesting entity is decoupled from the detailed structure of the underlying physical data to be accessed. Logical queries based on the framework can be constructed without regard for the makeup of the physical data. Further, changes to the physical data do not necessitate changes to applications that access the physical data.

Using a data abstraction model, abstract queries based on the framework can be constructed without regard for the makeup of the underlying physical data. For instance, assume a user in a hospital wants to determine last and first names of employees having worked over ten years. To this end, the user may specify the following abstract query: "FIND LAST NAME, FIRST NAME" and "WHERE YRS EMPLOY-RESULT>10". The logical field names "LAST NAME", "FIRST NAME" and "YRS EMPLOY-RESULT" specified in the abstract query correspond to logical field names of respective logical fields in the data abstraction model.

Some research tools take querying a database a step further. For example, IBM's Data Discovery and Query Builder (DDQB) allows researchers and medical providers to analyze and identify correlations between and within data sets instead of having to manually search through records or requiring the intervention of a database administrator.

While a database can be a very effective research tool, only the information contained in the database is able to be queried. For this and other reasons, service-oriented architectures (SOAs) were created. An SOA describes IT infrastructure that allows different applications or services to exchange data with one another as they participate in business processes. The process of communication involves either simple data passing or two or more services coordinating some activity. Services are intrinsically unassociated units of functionality, which have no calls to each other embedded in them. Example services may include filling out an online application for an account, viewing an online bank statement, or placing an online booking or airline ticket order. Instead of services embedding calls to each other in their source code, protocols are defined that describe how one or more services communicate with each other. SOAs also link databases, broadening the scope of available information to be researched.

The increased access and capability provided by SOA processes also increases the need to focus requests for information and other services. Unfocused searches of the relatively larger pool of services and data can result in irrelevant results, as well as an overwhelming amount of information.

IV. SUMMARY

In a particular embodiment, a computerized method includes receiving a selection of a particular logical field via a database query interface. The method includes querying a discovery registry associated with a data abstraction model of a database to discover one or more web services that are resolvable based on the particular logical field. The data abstraction model includes a plurality of logical fields, where each logical field corresponds to a particular data structure of the database. A web service input of a first discovered web service is associated with a first logical field of the data abstraction model via the discovery registry. A web service output of the first discovered web service is associated with a second logical field of the data abstraction model via the discovery registry. The method further includes displaying a modified database query interface that includes a text entry element to receive a text search term and a first selectable input associated with the first discovered web service. In one embodiment, a first web service query result interface is displayed in response to selection of the first selectable input associated with the first discovered web service. The first web service query result interface includes information retrieved in response to execution of the first discovered web service based on the text search term received via the text entry element of the modified database query interface.

In another particular embodiment, a system includes a processor, an input interface, and a computer readable storage medium. The input interface is configured to receive a selection of a particular logical field via a database query interface. The computer readable storage medium is configured to store a data abstraction model of a database, a discovery registry, a resolver, and a user interface component. The data abstraction model includes a plurality of logical fields, where each logical field corresponds to a particular data structure of the database. The discovery registry is associated with the data abstraction model of the database. The discovery registry associates a plurality of web services with a plurality of logical fields of the data abstraction model. The resolver is executable by the processor to query the discovery registry to discover one or more web services that are resolvable based on the particular logical field received via the database query interface. A web service input of a first discovered web service is associated with a first logical field of the data abstraction model via the discovery registry, and a web service output of the first discovered web service is associated with a second logical field of the data abstraction model via the discovery registry. The user interface component is executable by the processor to display a modified database query interface that includes a text entry element to receive a text search term and a first selectable input associated with the first discovered web service.

In another particular embodiment, a computer readable storage medium includes instructions that are executable by a processor. The instructions, when executed by the processor, cause the processor to receive a selection of a particular logical field via a database query interface. The instructions, when executed by the processor, further cause the processor to query a discovery registry associated with a data abstraction model of a database to discover one or more web services that are resolvable based on the particular logical field. The data abstraction model includes a plurality of logical fields, where each logical field corresponds to a particular data structure of the database. A web service input of a first discovered web service is associated with a first logical field of the data abstraction model via the discovery registry, and a web service output of the first discovered web service is associated with a second logical field of the data abstraction model via the discovery registry. Further, a web service input of a second discovered web service is associated with a third logical field of the data abstraction model via the discovery registry, and a web service output of the second discovered web service is associated with the second logical field of the data abstraction model via the discovery registry. The instructions, when executed by the processor, further cause the processor to display a modified database query interface that includes a text entry element to receive a text search term, a first selectable input associated with the first discovered web service, and a second selectable input associated with the second discovered web service.

These and other advantages and features that characterize embodiments of the disclosure are set forth in the claims annexed hereto and forming a further part hereof. However, for a better understanding of the disclosure, and of the advantages and objectives attained through its use, reference should be made to the drawings and to the accompanying descriptive matter in which there are described exemplary embodiments of the disclosure.

V. BRIEF DESCRIPTION OF THE DRAWINGS

Figure 5:
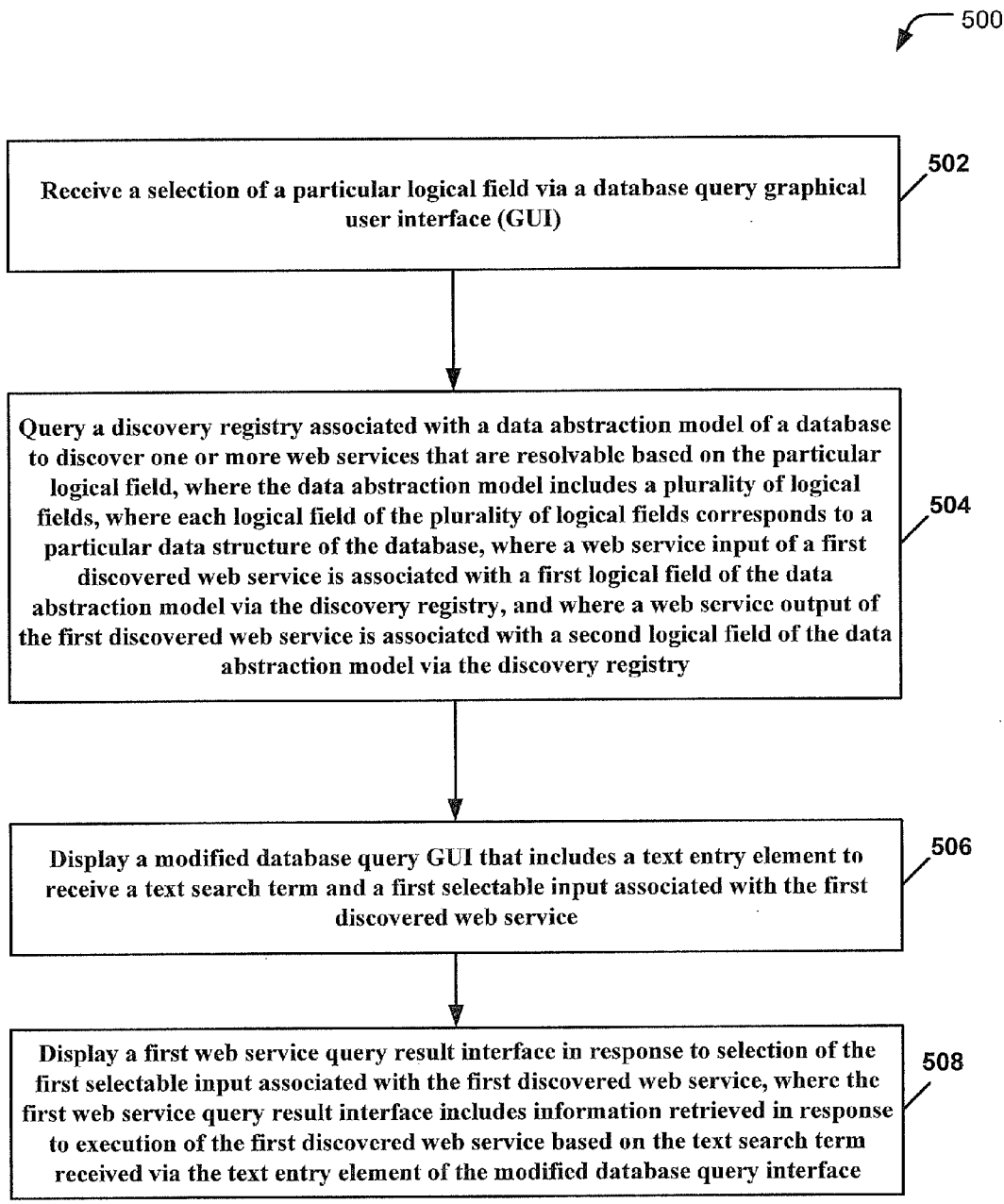
Figure 6:
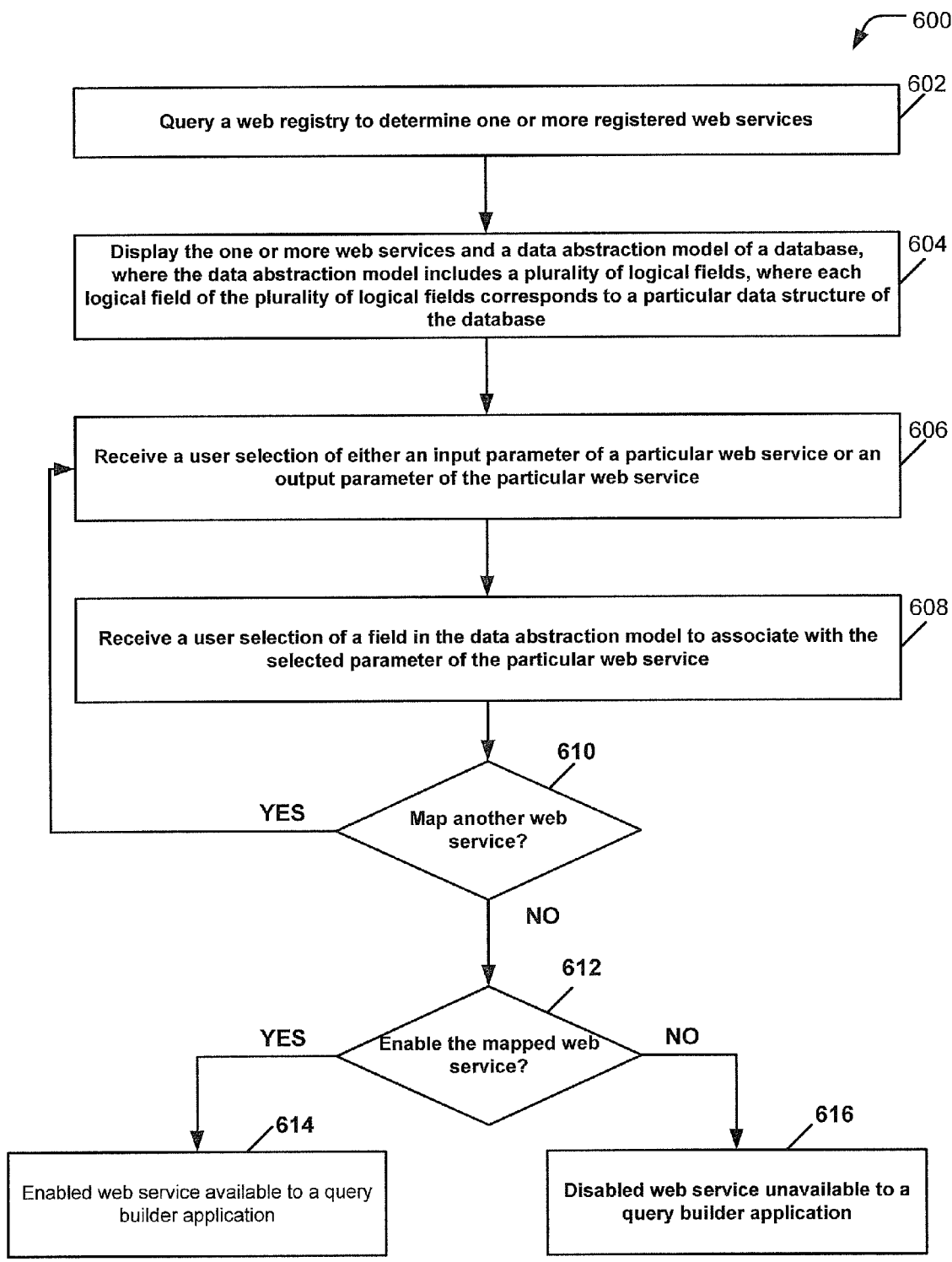

FIG. 5 is a flow diagram of a particular embodiment of a method of modifying a database query interface to identify one or more web services that are resolved based on a logical field of a data abstraction model; and FIG. 6 is a flow diagram of a particular embodiment of a method of mapping one or more web services included in a web registry to a discovery registry associated with a data abstraction model of a database.

VI. DETAILED DESCRIPTION

A particular embodiment of the present disclosure relates to a structured query language (SQL) condition function resolver that may be used instead of a set of static DDQB plug-ins. The SQL condition function resolver may obtain information about a field currently being used and look up SOA components (e.g., web services) that are applicable to the field.

Typically, when a web service is created, the web service is placed into a registry so that the web service may be discovered and used. In a particular embodiment of the present disclosure, when the web service is registered in a web registry, the web service is also registered with a DDQB discovery registry where DDQB semantic types may be captured.

To illustrate, multiple web services may be designed to enable a user to look up employees using different types of available information. For example, a first web service may include a department lookup service that relies on a department identification input, a second web service may include a support lookup service that relies on a support e-mail input, and a third web service may include a product owner lookup service that relies on a product name input. Each of the web services may be "tagged" with a concept of the web service as it relates to a data abstraction model of a particular organization.

For example, a web service input associated with the department lookup service may include a department identification input (e.g., "Dept ID"). This input may be "mapped" to an appropriate DDQB field reference (e.g., "<data://Employee/Department Code> (1)"). A web service output associated with the department lookup service may include a list of employee identifiers (e.g., "List of Employee IDs"). This output may be "mapped" to an appropriate DDQB field reference (e.g., "<data://Employee/Employee ID> (0-N)").

As another example, a web service input associated with the support lookup service may include a support e-mail input (e.g., "Support e-mail"). This input may be "mapped" to an appropriate DDQB field reference (e.g., "<data://Employee/EmailAddress> (1)"). A web service output associated with the support lookup service may include a list of employee identifiers (e.g., "List of Employee IDs"). This output may be "mapped" to an appropriate DDQB field reference (e.g., "<data://Employee/Employee ID> (0-N)").

As a further example, a web service input associated with the product owner lookup service may include a product name input (e.g., "Product Name"). This input may be "mapped" to an appropriate DDQB field reference (e.g., "<data://Employee/Product Name> (1)"). A web service output associated with the product owner lookup service may include a list of employee identifiers (e.g., "List of Employee IDs"). This output may be "mapped" to an appropriate DDQB field reference (e.g., "<data://Employee/Employee ID> (0-N) ").

Thus, each of the illustrative web services have been "tagged" with its associated concept as related to the data abstraction model of the organization. As such, when DDQB uses a field, the field is used to determine web services that can be resolved based on a particular input. Each resolvable web service may be displayed as a selectable image or icon within a DDQB condition building screen. This discovery process may provide the ability to continuously grow the functionality of the DDQB product without modifying the product itself. As new services come online within the organization, the services may be made available.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
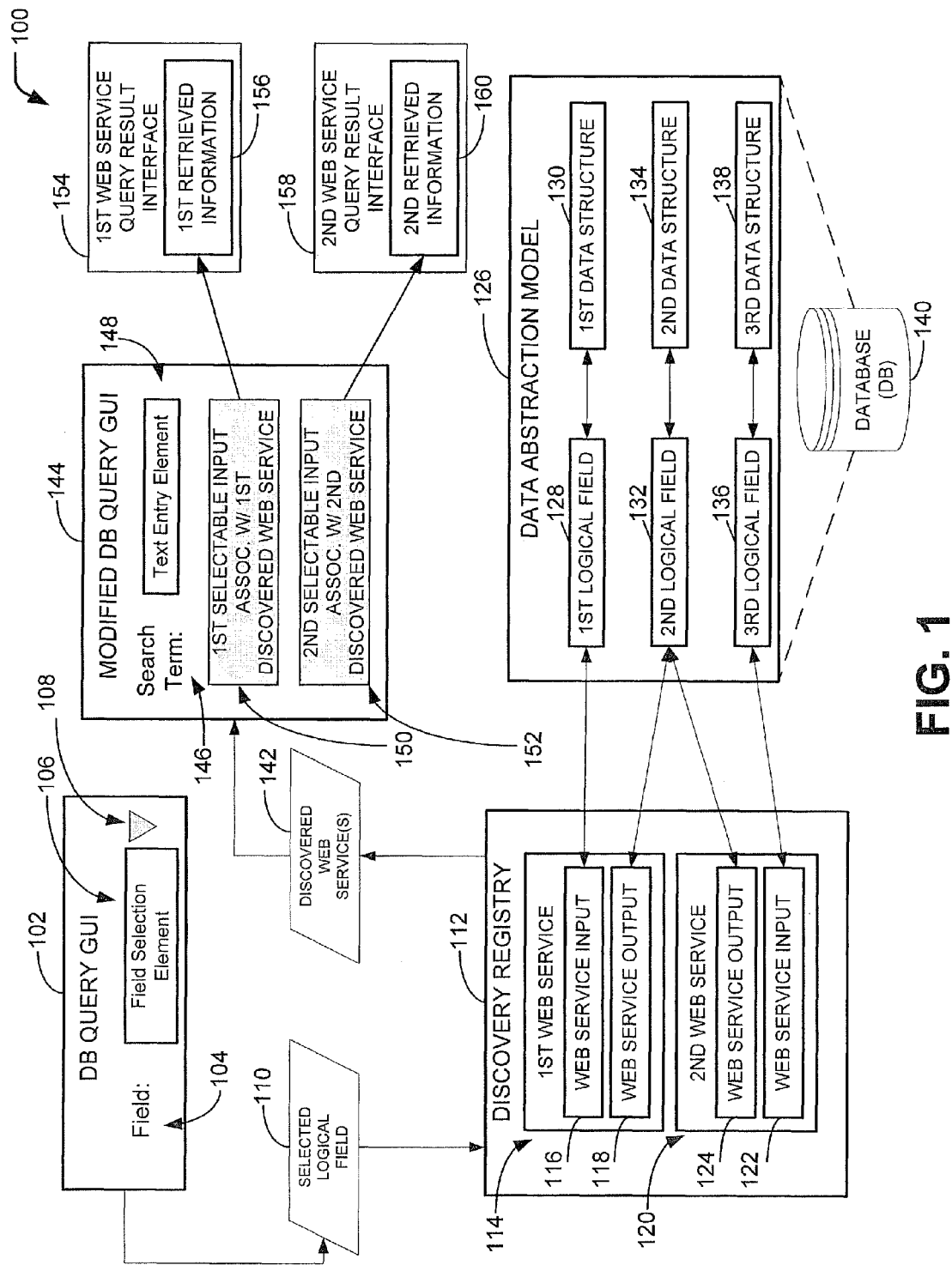
FIG. 1 is a block diagram of an illustrative embodiment of a system to modify a database query interface to identify one or more web services that are resolved based on a logical field of a data abstraction model.

Referring to FIG. 1, a particular embodiment of a system to modify a database query interface to include one or more web services that are resolved based on a logical field of a data abstraction model is illustrated and generally designated 100. Web services that are registered in a web registry may also be registered with a discovery registry, where input and output parameters of the web services may be mapped to logical fields of a data abstraction model of a database. The system 100 of FIG. 1 may provide additional functionality to a database query application by making certain web services (e.g., web services that are mapped to logical fields of the data abstraction model of the database) available when designing database queries.

The system 100 of FIG. 1 includes a database (DB) query interface 102, a data abstraction model 126 of a database 140, and a discovery registry 112 associated with the data abstraction model 126. The system 100 may generate a modified database query interface 144. In a particular embodiment, one or more of the database query interface 102 and the modified database query interface 144 may be graphical user interfaces (i.e., GUIs).

The database query interface 102 is adapted to receive a selection of a particular logical field 104. For example, a user may select the particular logical field 104 from a plurality of logical fields via a field selection element 106. To illustrate, the user may select an icon 108 to display the plurality of logical fields in a list format, and the user may select one of the logical fields by highlighting or otherwise selecting the logical field. In response to selection of a selected logical field 110, the discovery registry 112 associated with the data abstraction model 126 may be queried to discover one or more web services that are resolvable based on the selected logical field 110.

The data abstraction model 126 includes a plurality of logical fields, and each logical field corresponds to a particular data structure of the database 140. For example, in the embodiment illustrated in FIG. 1, the plurality of logical fields includes a first logical field 128, a second logical field 132, and a third logical field 136. The first logical field 128 corresponds to a first data structure 130 of the database 140 (e.g., a first schema or table), the second logical field 132 corresponds to a second data structure 134 of the database 140, and the third logical field 136 corresponds to a third data structure 138 of the database 140. A web service input of a particular web service is associated with a logical field of the data abstraction model 126 via the discovery registry 112, and a web service output of the particular web service is associated with a second logical field of the data abstraction model 126 via the discovery registry 112.

In the embodiment illustrated, a first web service 114 and a second web service 120 may be determined to be resolvable based on the selected logical field 110. Alternatively, any number of web services may be determined to be resolvable.

A web service input 116 and a web service output 118 are associated with the first web service 114. Similarly, a web service input 122 and a web service output 124 are associated with the second web service 120. As illustrated in FIG. 1, the web service input 116 of the first web service 114 is associated with the first logical field 128 of the data abstraction model 126 via the discovery registry 112, and the web service output 118 of the first web service 114 is associated with the second logical field 132 of the data abstraction model 126 via the discovery registry 112. The web service input 122 of the second web service 120 is associated with the third logical field 136 of the data abstraction model 126 via the discovery registry 112, and the web service output 124 of the second web service 120 is associated with the second logical field 132 of the data abstraction model 126 via the discovery registry 112.

To illustrate, the first web service 114 may include a department lookup service. In this case, the web service input 116 associated with the department lookup service may include a department identification input (e.g., "Dept ID") that is associated with an employee department code logical field (e.g., "<data://Employee/Department Code> (1)") of the data abstraction model 126 via the discovery registry 112. The web service output 118 associated with the department lookup service may include a list of employee identifiers (e.g., "List of Employee IDs") that are associated with an employee identification logical field (e.g., "<data://Employee/Employee ID> (0-N)") of the data abstraction model 126 via the discovery registry 112. Thus, the department lookup service may enable a user to look up employees based on a first type of information (e.g., based on a department identifier).

As another example, the second web service 120 may include a support lookup service. In this case, the web service input 116 associated with the support lookup service may include a support e-mail input (e.g., "Support e-mail") that is associated with an employee e-mail address logical field (e.g., "<data://Employee/EmailAddress> (1)") data abstraction model 126 via the discovery registry 112. The web service output 118 associated with the support lookup service may include a list of employee identifiers (e.g., "List of Employee IDs") that are associated with an employee identification logical field (e.g., "<data://Employee/Employee ID> (0-N)") of the data abstraction model 126 via the discovery registry 112. Thus, the support lookup service may enable a user to look up employees based on a second type of information (e.g., based on an employee e-mail address).

In another embodiment, the discovery registry 112 includes a third web service (not shown). For example, the third web service may include a product owner lookup service. A web service input associated with the product owner lookup service may include a product name input (e.g., "Product Name") that is associated with a product name logical field (e.g., a fourth logical field, not shown) of the data abstraction model 126 via the discovery registry 112. The web service output associated with the product owner lookup service may include a list of employee identifiers (e.g., "List of Employee IDs") that are associated with an employee identification logical field (e.g., "<data://Employee/Employee ID> (0-N)") of the data abstraction model 126 via the discovery registry 112 (e.g., the second logical field 132). Thus, the product owner lookup service may enable a user to look up employees based on a third type of information (e.g., based on a product name).

As shown in FIG. 1, the web service output 118 of the first web service 114 and the web service output 124 of the second web service 120 are both associated with the same logical field of the data abstraction model 126 (e.g., the second logical field 132). Thus, the discovery registry 112 may enable different web service outputs to be mapped to a common logical field. For example, the user may look up employees based on a first type of information (e.g., based on a department identifier), based on a second type of information (e.g., based on a support e-mail address), or based on a third type of information (e.g., a product name). In each case, a list of employee identifiers may be returned. In the event that the user knows the department identifier, the user may locate the employee using the department lookup service. In the event that the user knows a support e-mail address, the user may locate the employee using the support lookup service. In the event that the user knows a product name, the user may locate the employee using the product name lookup service. Each web service is tagged with the concept of looking up employees as it would relate to the data abstraction model 126 of the database 140.

The modified database query interface 144 is displayed based on one or more discovered web services 142. The modified database query interface 144 includes a text entry element 148 to receive a text search term 146 and at least one selectable input associated with a discovered web service. For example, in the embodiment illustrated in FIG. 1, the modified database query interface 144 includes a first selectable input 150 associated with the first discovered web service 114 and a second selectable input 152 associated with the second discovered web service 120. In alternative embodiments, the modified database query interface 144 may include any number of selectable inputs that are each associated with a particular discovered web service.

In response to selection of the first selectable input 150 associated with the first discovered web service 114, a first web service query result interface 154 is displayed. The first web service query result interface 154 includes first information 156 retrieved in response to execution of the first discovered web service 114 based on the text search term 146 received via the text entry element 148 of the modified database query interface 144. For example, the text search term 146 may include an employee department (e.g., "HJAA"), and the first selectable input 150 may include a department lookup web service (see FIG. 2). Upon entry of the text search term 146 of "HJAA" and in response to selection of the first selectable input 150, the first web service query result interface 154 with a list of employee identifiers associated with the "HJAA" employee department (e.g., the first retrieved information 156) may be displayed (see FIG. 3).

In response to selection of the second selectable input 152 associated with the second discovered web service 120, a second web service query result interface 158 is displayed. The second web service query result interface 158 includes second information 160 retrieved in response to execution of the second discovered web service 120 based on the text search term 146 received via the text entry element 148 of the modified database query interface 144. For example, the text search term 146 may include a support e-mail address, and the second web service query result interface 158 with a list of employee identifiers associated with the support e-mail address (e.g., the second retrieved information 160) may be displayed.

The modified database query interface 144 may include any number of selectable inputs associated with the discovered web services 142 that are resolvable based on the selected logical field 110. For example, the modified database query interface 144 may further include a third selectable input (not shown) associated with a third discovered web service that is resolvable based on the selected logical field 110. In response to selection of a third selectable input (not shown) associated with the third discovered web service, a third web service query result interface (not shown) may be displayed. The third web service query result interface may include third information retrieved in response to execution of the third discovered web service based on the text search term 146 received via the text entry element 148 of the modified database query interface 144. For example, the text search term 146 may include a product name, and the third web service query result interface with a list of employee identifiers associated with the product name may be displayed.

The features of the present disclosure may have particular application within such environments as a DDQB web-based framework. As an example, the web-based framework may help physicians or researchers (among others) to search through data files to identify and correlate data based on demographics, lab tests and diagnostics, as well as laboratory and physician notes. This search capability tool may enable users with various levels of expertise to easily configure queries and leverage the full spectrum of information assets. DDQB applications may enable users to build queries ranging from simple to complex, and run the queries against a user's data environment.

Embodiments consistent with the present disclosure may allow queries to be edited and saved for later use. Results from queries may be displayed in HTML, CSV, XML, TAB Delimited, or XLS formats. Further, users may be able to save query results for future use or collaboration with others. Query results may also be passed to configurable and/or pluggable analysis routines. Such features may be realized without requiring the user to have knowledge of complex data query languages.

Figure 2:
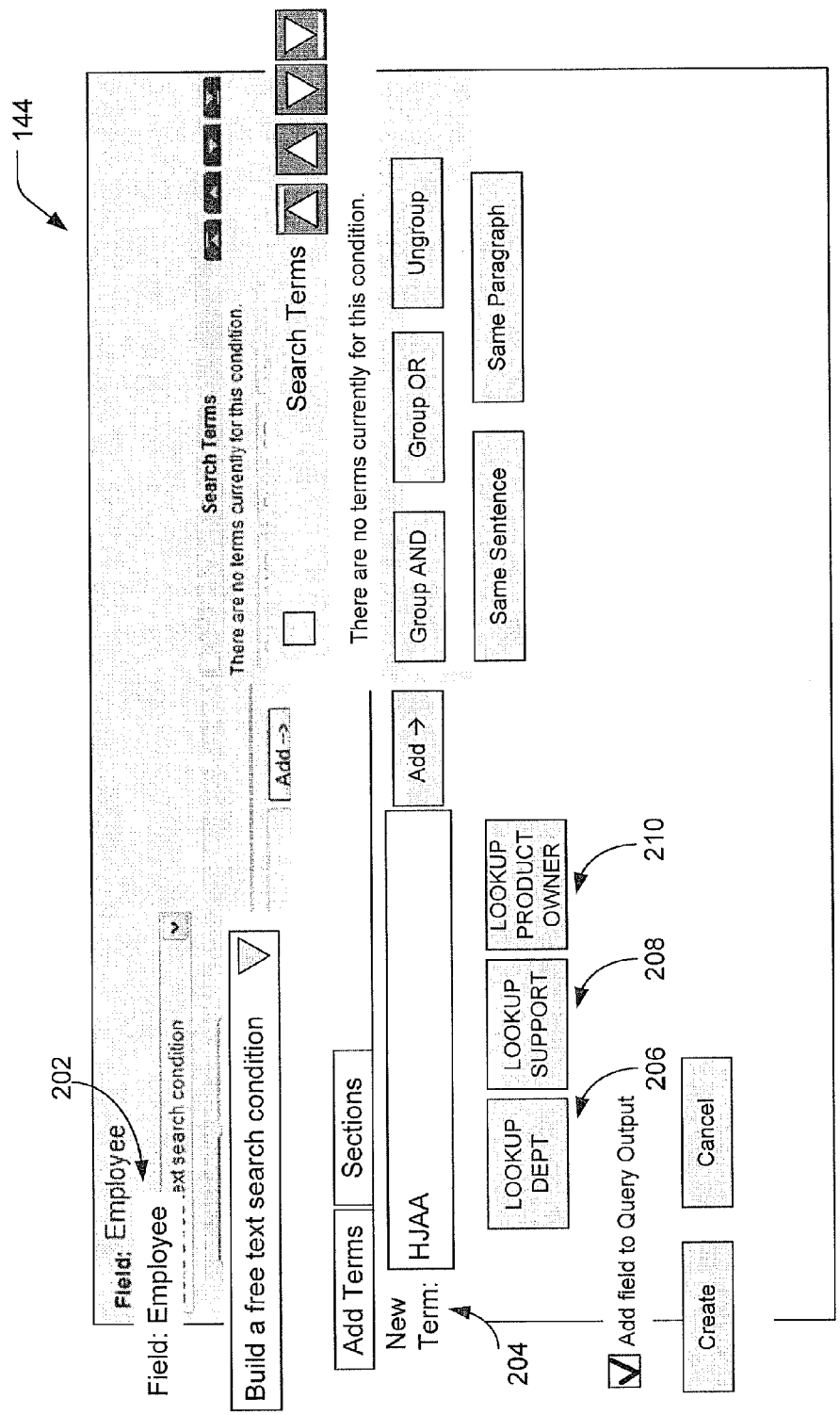
FIG. 2 is an illustrative embodiment of a modified database query interface that identifies web services that are resolved based on a logical field of a data abstraction model.

Referring to FIG. 2, a particular embodiment of a modified database query interface (e.g., a modified database query GUI) that includes web services that are resolved based on a logical field of a data abstraction model is illustrated and generally designated 144. The modified database query interface 144 of FIG. 2 corresponds to the modified database query interface 144 of FIG. 1. The modified database query interface 144 may represent an improved database query interface that may enable a user to execute a discovered web service associated with a logical field of a data abstraction model of a database.

The modified database query interface 144 is associated with a particular logical field 202 of a data abstraction model of a database. For example, the particular logical field 202 of FIG. 2 may be the selected logical field 110 of the data abstraction model 126 of the database 140 of FIG. 1. In the embodiment illustrated in FIG. 2, the particular logical field 202 includes an "Employee" field. A text search term 204 may be provided via the modified database query interface 144.

In the embodiment illustrated in FIG. 2, the modified database query interface 144 includes a first selectable input 206 associated with a first discovered web service, a second selectable input 208 associated with a second discovered web service, and a third selectable input 210 associated with a third discovered web service. For example, the first selectable input 206 may correspond to a department lookup service, the second selectable input 208 may correspond to a support lookup service, and the third selectable input 210 may correspond to a product owner lookup service.

In the event that a user knows a department identifier, the text search term 204 provided by the user may be the department identifier, and the user may select the first selectable input 206 that corresponds to the department lookup service. In the event that the user knows a support e-mail address, the text search term 204 provided by the user may be the support e-mail address, and the user may select the second selectable input 208 that corresponds to the support lookup service. In the event that the user knows a product name, the text search term 204 provided by the user may be the product name, and the user may select the third selectable input 210 that corresponds to the product owner lookup service.

In the embodiment illustrated, the text search term 204 is "HJAA," corresponding to a department identifier. As such, the user may select the first selectable input 206 that corresponds to the department lookup service in order to locate an employee. In response to selection of the first selectable input 206, the department lookup service is executed with a web service input of "HJAA." Information retrieved by the department lookup service may correspond to a list of employees associated with the "HJAA" department. In a particular embodiment, a web service query result interface may be displayed that includes the list of employees (see FIG. 3). For example, the web service query result interface may correspond to the first web service query result interface 154 of FIG. 1, and the list of employees may correspond to the first retrieved information 156.

As another example, the text search term 204 may correspond to a support e-mail address, and the user may select the second selectable input 208 that corresponds to the support lookup service in order to locate an employee. In response to selection of the second selectable input 208, the support lookup service is executed with a web service input of the support e-mail address. As a further example, the text search term 204 may correspond to a product name, and the user may select the third selectable input 210 that corresponds to the support lookup service in order to locate an employee. In response to selection of the third selectable input 210, the product owner lookup service is executed with a web service input of the product name.

In one embodiment, maintenance functionality may allow a user to remove a selectable input from the modified database query interface 144. For example, the first selectable input 206 may be removed in response to a user selection of a first removal option. To illustrate, the user may right-click on the first selectable input 206 and select a "Do not show this feature" option from a context menu (not shown). In one embodiment, the first selectable input 206 is removed from the modified database query interface 144 for the user. As another example, the second selectable input 208 may be removed in response to selection of a second removal option. For example, an administrator may right-click on the second selectable input 208 and select a "Do not show this feature" option from a context menu. In one embodiment, the second selectable input 208 is removed from the modified database query interface 144 for all users in response to the administrator selection.

Figure 3:
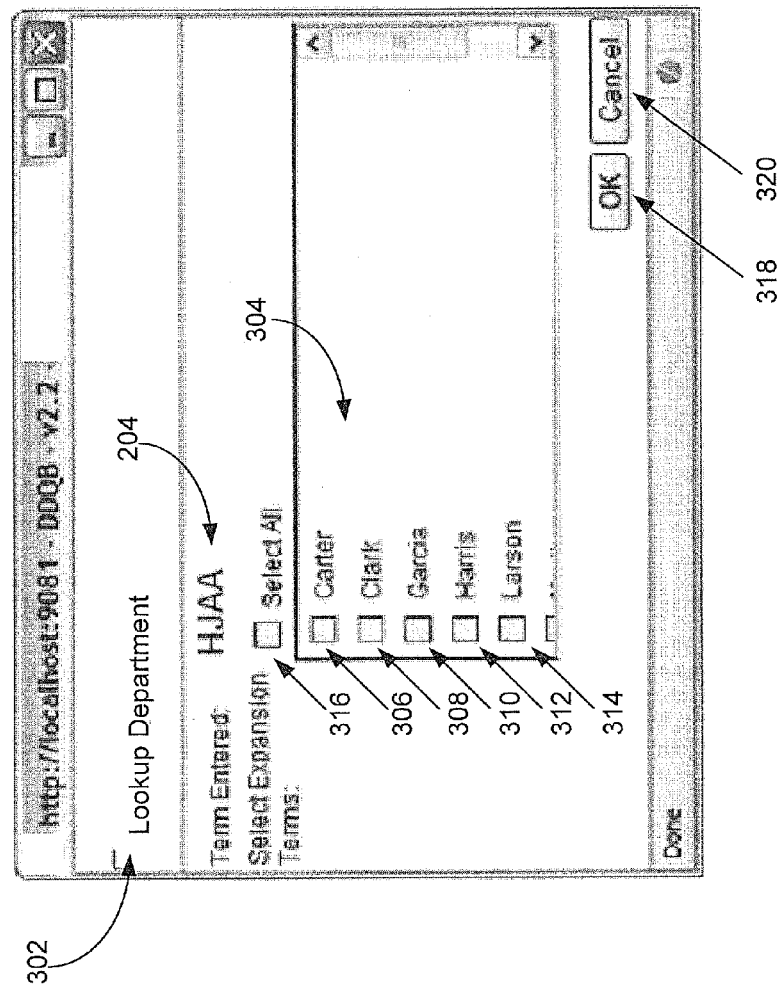
FIG. 3 is an illustrative embodiment of a web service query result interface displayed in response to selection of a web service of a modified database query interface.

Referring to FIG. 3, a particular embodiment of a web service query result interface (e.g., a web service query result GUI) displayed in response to selection of a web service of a modified database query interface is illustrated and generally designated 154. The web service query result interface 154 of FIG. 3 is displayed in response to a selection of the first selectable input 150 associated with a department lookup service of the modified database query interface 144 of FIG. 2.

The web service query result interface 154 is displayed in response to execution of a discovered web service based on a text search term received via a text entry element of a modified database query interface. The web service query result interface 154 includes information 304 retrieved by a particular web service 302. In the embodiment illustrated, the particular web service 302 includes a department lookup web service, and the information 304 retrieved by the department lookup web service includes a list of employees associated with a text search term 204. For example, the text search term 204 may be the "HJAA" employee department of FIG. 2. In the embodiment illustrated, the list of employees associated with the "HJAA" employee department includes a first employee name 306 (e.g., "Carter"), a second employee name 308 (e.g., "Clark"), a third employee name 310 (e.g., "Garcia"), a fourth employee name 312 (e.g., "Harris"), and a fifth employee name 314 (e.g., "Larson"). The user may select individual employee names (e.g., using a check box associated with the name) or may select all of the employee names using a select all option 316.

Thus, the user may refine a database query by selecting particular employees using a particular discovered web service that returns a list of employees associated with a particular web service input (e.g., the employee department of "HJAA" in the example of FIG. 3). As such, the functionality of a database query tool may be improved by integrating applicable web services. As more web services become available, the database query tool (e.g., DDQB query builder) may be further improved without customized code development (e.g., custom plug-ins) or other modifications to the underlying database query tool.

Figure 4:
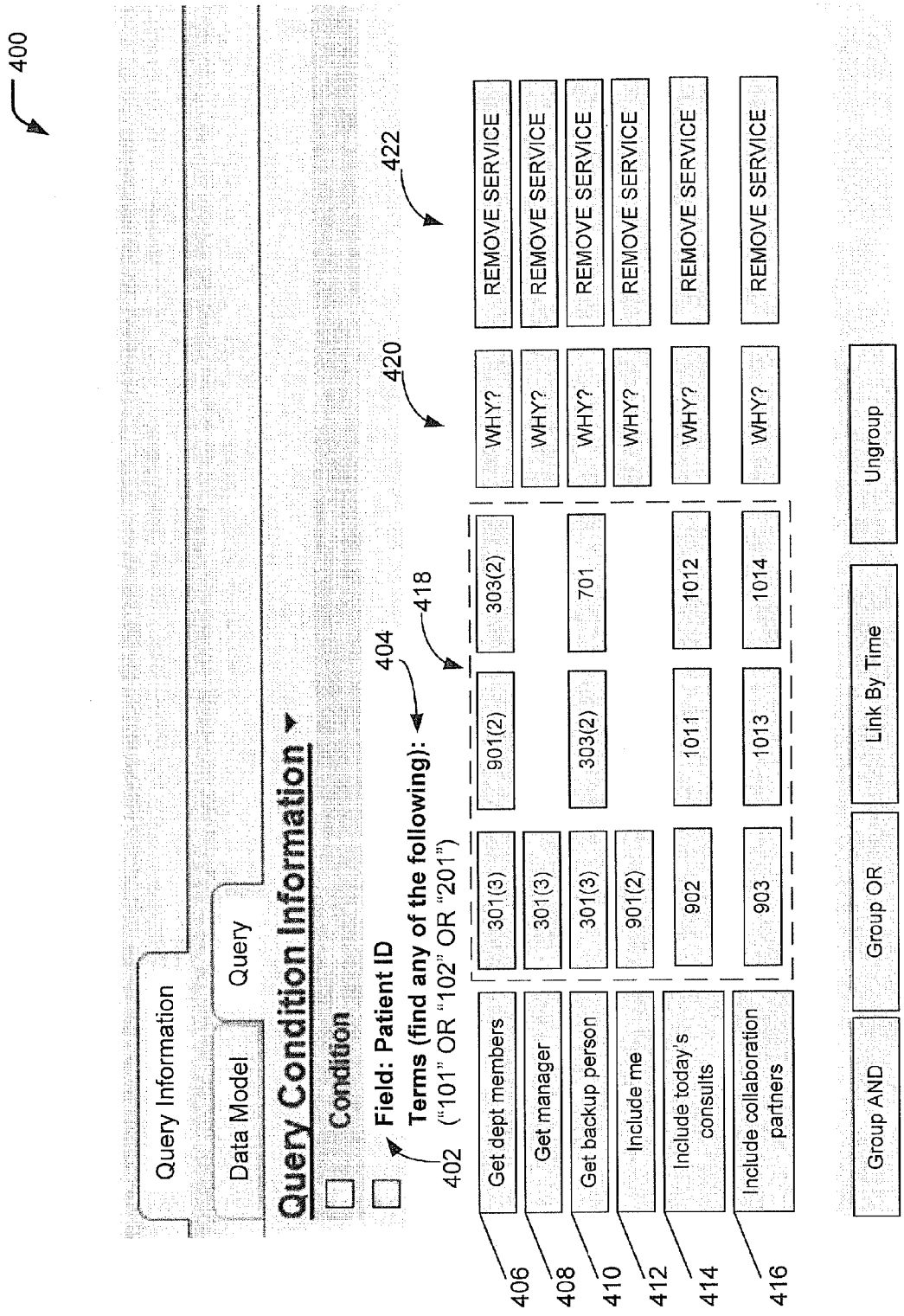
FIG. 4 is a block diagram of a particular embodiment of a system to modify a database query interface to identify one or more web services that are resolved based on a logical field of a data abstraction model.

Referring to FIG. 4, a particular embodiment of a system to modify a database query interface to include one or more web services that are resolved based on a logical field of a data abstraction model is illustrated and generally designated 400.

The system 400 includes a processor 402, a memory 404 (e.g., a computer readable storage medium), and an interface 406. The interface 406 is configured to receive user input 430 (e.g., a selection of a particular logical field) via a database query interface 102. The interface 406 is further configured to communicate via a network 408 and with a mass storage device 410 that includes a database 140.

The memory 404 is configured to store a data abstraction model 126 of the database 140. The data abstraction model 126 may map semantic names to data in the database 140. The data abstraction model 126 includes a plurality of logical fields, where each logical field of the plurality of logical fields corresponds to a particular data structure of the database 140. In the embodiment illustrated, the database 140 is stored outside of the memory 404. Alternatively, the memory 404 may be configured to store the database 140. The database 140 is representative of any collection of data regardless of the particular physical representation of the data. A physical representation of data defines an organizational schema of the data. By way of illustration, the database 140 may be organized according to a relational schema (accessible by SQL queries) or according to an XML schema (accessible by XML queries). However, the present disclosure is not limited to a particular schema and contemplates extension to schemas presently unknown. As used herein, the term "schema" generically refers to a particular arrangement of data.

The data abstraction model 126 is referred to herein as a logical representation because the data abstraction model 126 defines logical fields corresponding to data structures in the database 140, thereby providing an abstract (i.e., logical) view of the data in the database 140. A data structure is a physical arrangement of the data, such as an arrangement in the form of a database table or a column of the database table. More specifically, each logical field defines a logical representation of a specific set of the data in the database 140. In a relational database environment having a multiplicity of database tables, a specific logical representation having specific logical fields can be provided for each database table. In this case, all specific logical representations together constitute the data abstraction model 126. Physical entities of data are arranged in the database 140 according to a physical representation of the data. A physical entity of data (interchangeably referred to as a physical data entity) is a data item in an underlying physical representation. Accordingly, a physical data entity is the data included in a database table or in a column of the database table.

The memory 404 is configured to store a discovery registry 112 associated with the data abstraction model 126 of the database 140. The discovery registry 112 associates a plurality of web services 414 with a plurality of logical fields of the data abstraction model 126. The discovery registry 112 may comprise a service container that provides remote access to services.

The memory 404 is further configured to store a resolver 416 that is executable by the processor 402 to query the discovery registry 112 to discover one or more web services 414 of the plurality of web services that are resolvable based on the particular logical field received via the database query interface 102. In one embodiment, the resolver 416 is a structured query language (SQL) condition function resolver. The SQL condition function resolver may be responsible for locating service outputs associated with and otherwise appropriate for a desired condition. The SQL condition function resolver may use SQL techniques to dynamically grow services, as opposed to static plug-ins. SQL is a database computer language designed for the retrieval and management of data in relational database management systems, database schema creation and modification, and database object access control management.

The memory 404 is further configured to store a user interface component executable by the processor 402 to display a modified database query interface 144 that includes a text entry element to receive a text search term and a first selectable input associated with the first discovered web service.

In the embodiment illustrated, the memory 404 stores a web registry 420. The web registry 420 includes discoverable information associated with the plurality of web services 414. An exemplary web registry 420 may include a Universal Description, Discovery and Integration (UDDI) registry. UDDI is a platform independent, XML-based registry for businesses to list themselves on the Internet.

A user may modify the discovery registry 112 via an application 428 that may be used to map a web service registered in the web registry 420 to the discovery registry 112 (see FIG. 6). In one embodiment, the discoverable information associated with a particular web service of the plurality of web services 414 may be stored at the discovery registry 112 when the particular web service is added to the web registry 420.

The database query interface 102 of FIG. 4 may be the database query interface 102 of FIG. 1, the discovery registry 112 may be the discovery registry 112 of FIG. 1, the data abstraction model 126 may be the data abstraction model 126 associated with the database 140 of FIG. 1, and the modified database query interface 144 may be the modified database query interface 144 of FIG. 1. The first web service query result interface 154 of FIG. 4 may be the first web service query result interface 154 of FIG. 1 that is generated in response to a selection of the first selectable input 150. The second web service query result interface 158 of FIG. 4 may be the second web service query result interface 158 of FIG. 1 that is generated in response to a selection of the second selectable input 152.

Referring to FIG. 5, a particular embodiment of a method of modifying a database query interface to include one or more web services that are resolved based on a logical field of a data abstraction model is illustrated and generally designated 500. In one embodiment, the method 500 may include modifying the database query interface 102 of FIG. 1 to generate the modified database query interface 144 of FIG. 1 that includes selectable inputs 150, 152 associated with discovered web services.

The method 500 includes receiving a selection of a particular logical field via a database query interface, at 504. For example, the method 500 may include receiving the selected logical field 110 of FIG. 1 via the database query interface 102 of FIG. 1.

The method 500 includes querying a discovery registry associated with a data abstraction model of a database to discover one or more web services that are resolvable based on the particular logical field, at 502. For example, the method 500 may include querying the discovery registry 112 of FIG. 1 associated with the data abstraction model 126 to discover the web services 142 that are resolvable based on the selected logical field 110. The data abstraction model includes a plurality of logical fields, where each logical field of the plurality of logical fields corresponds to a particular data structure of the database. For example, in FIG. 1, the first logical field 128 corresponds to the first data structure 130 of the database 140, the second logical field 132 corresponds to the second data structure 134 of the database 140, and the third logical field 136 corresponds to the third data structure 138 of the database 140. A web service input of a first discovered web service is associated with a first logical field of the data abstraction model via the discovery registry, and a web service output of the first discovered web service is associated with a second logical field of the data abstraction model via the discovery registry. For example, in FIG. 1, a web service input 116 of the first web service 114 is associated with the first logical field 128, and the web service output 118 of the first web service 114 is associated with the second logical field 132.

The method 500 further includes displaying a modified database query interface that includes a text entry element to receive a text search term and a first selectable input associated with the first discovered web service, at 506. For example, in FIG. 1, the modified database query GUI 144 includes the text entry element 148 to receive a text search term 146 and the first selectable input 150 associated with the first discovered web service 114.

In the embodiment illustrated in FIG. 5, the method 500 includes displaying a first web service query result interface in response to selection of the first selectable input associated with the first discovered web service, at 508. The first web service query result interface includes information retrieved in response to execution of the first discovered web service based on the text search term received via the text entry element of the modified database query interface. For example, in FIG. 1, the first web service query result interface 154 is displayed in response to selection of the first selectable element 150 associated with the first discovered web service 114. In FIG. 1, the first web service query result interface 154 includes first retrieved information 156 that is retrieved in response to execution of the first discovered web service 114 based on the text search term 146 received via the text entry element 148 of the modified database query interface 144.

Referring to FIG. 6, a particular embodiment of a method of mapping one or more web services included in a web registry to a discovery registry associated with a data abstraction model of a database is illustrated and generally designated 600. For example, the method 600 may include mapping one or more web services included in the web registry 420 of FIG. 4 to the discovery registry 112 associated with the data abstraction model 126 of the database 140.

The method 600 includes querying a web registry to determine one or more web services registered at the web registry, at 602. For example, the web registry 420 of FIG. 4 may be queried to determine one or more web services registered at the web registry 420. The method 600 includes displaying the one or more web services and a data abstraction model of a database, at 604. The data abstraction model includes a plurality of logical fields that each correspond to a particular data structure of the database. For example, the data abstraction model may be the data abstraction model 126 of FIG. 4, and a GUI may display the one or more web services of the web registry 420 side by side with a tree representation of the data abstraction model 126. In the event that a user selects to map one of the web services, the method 600 includes receiving a user selection of either an input parameter of a particular web service or an output parameter of the particular web service, at 606. For example, the user may select the web service input 116 of the first web service 114 or the web service output 118 of the first web service 114 of FIG. 1.

The method 600 includes receiving a user selection of a field in the data abstraction model to associate with the selected parameter of the particular web service, at 608. For example, the GUI may enable the user to associate a web service parameter with a logical field of the data abstraction model. For example, in FIG. 1, the user may map the web service input 116 to the first logical field 128 and may map the web service output 118 to the second logical field 132 of the data abstraction model 126. The mapping information between web service parameters and logical fields of the data abstraction model may be stored at a discovery registry (e.g., the discovery registry 112 of FIG. 1).

The method 600 may be repeated for multiple web services included in the web registry. The method 600 may include determining whether the user desires to map another web service, at 610. If so, the method 600 may return to 606 in order to allow the user to map web service parameters of a second web service to logical fields of the data abstraction model. For example, in FIG. 1, the user may map the web service input 122 of the second web service 120 to the third logical field 136 and may map the web service output 124 to the second logical field 132 of the data abstraction model 126. The method 600 may allow the user to map any number of web services to logical fields of the data abstraction model and to store the mapping information at a discovery registry (e.g., the discovery registry 112 of FIG. 1).

Upon completion of the mapping operations, the method 600 may include determining whether the user desires to enable or disable the mapped web service, at 612. The method 600 may include enabling a selected web service, at 614. By enabling the selected web service, the selected web service is made available to a query builder application (e.g., DDQB query builder). For example, in the embodiment illustrated in FIG. 1, the first web service 114 is enabled, resulting in the first selectable input 150 associated with the first web service 114 being made available to the modified database query interface 144 (e.g., as a selectable button or icon). As another example, in the embodiment illustrated in FIG. 1, the second web service 120 is enabled, resulting in the second selectable input 152 associated with the second web service 120 being made available to the modified database query interface 144 (e.g., as a different selectable button or icon).

In alternative embodiments, the method 600 may include disabling a selected web service, at 616. By disabling the selected web service, the selected web service is unavailable to a query builder application. For example, in the event that the first web service 114 of FIG. 1 were disabled, the first selectable input 150 associated with the first web service 114 would be unavailable to the modified database query interface 144. That is, a selectable button or icon associated with the first web service 114 would not be displayed via the modified database query interface 144. As another example, in the event that the second web service 120 of FIG. 1 were disabled, the second selectable input 152 associated with the second web service 120 would be unavailable to the modified database query interface 144. That is, a selectable button or icon associated with the second web service 120 would not be displayed via the modified database query interface 144.

Thus, the method 600 of FIG. 6 may allow a user to map any number of web services to logical fields of the data abstraction model and to store the mapping information at a discovery registry (e.g., the discovery registry 112 of FIG. 1). Enabled web services may be made available to a query builder application (e.g., displayed via the modified database query interface 144 of FIG. 1). Further, by enabling the user to disable mapped web services, the number of web services that are displayed at the query builder application may be limited. Limiting the number of available web services may be beneficial for users of the query builder application by reducing the number of web services to review when building a query.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method, comprising:
    receiving a selection of a particular logical field via a database query interface;
    querying a discovery registry associated with a data abstraction model of a database to discover at least a first web service and a second web service that are resolvable based on the particular logical field that is received via the database query interface, wherein the data abstraction model includes a plurality of logical fields, wherein each logical field of the plurality of logical fields corresponds to a particular data structure of the database, wherein a web service input of the first discovered web service is associated with a first logical field of the data abstraction model via the discovery registry, wherein a web service output of the first discovered web service is associated with a second logical field of the data abstraction model via the discovery registry, wherein a web service input of the second discovered web service is associated with a third logical field of the data abstraction model via the discovery registry, and wherein a web service output of the second discovered web service is associated with the second logical field of the data abstraction model via the discovery registry;
    modifying the database query interface to include a text entry element to receive a text search term, a first selectable input associated with the first discovered web service, and a second selectable input associated with the second discovered web service; and
    displaying a modified database query interface that includes the text entry element to receive the text search term, the first selectable input associated with the first discovered web service, and the second selectable input associated with the second discovered web service.

2. The computer-implemented method of claim 1, further comprising displaying a first web service query result interface in response to selection of the first selectable input associated with the first discovered web service, wherein the first web service query result interface includes information retrieved in response to execution of the first discovered web service based on the text search teen received via the text entry element of the modified database query interface.

3. The computer-implemented method of claim 1, further comprising displaying a second web service query result interface in response to selection of the second selectable input associated with the second discovered web service, wherein the second web service query result interface includes information retrieved in response to execution of the second discovered web service based on the text search term received via the text entry element of the modified database query interface.

4. The computer-implemented method of claim 1, wherein the modified database query interface further includes a third selectable input associated with a third discovered web service that is resolvable based on the particular logical field that is received, wherein a web service input of the third discovered web service is associated with a fourth logical field of the data abstraction model via the discovery registry, and wherein a web service output of the third discovered web service is associated with the second logical field of the data abstraction model via the discovery registry.

5. The computer-implemented method of claim 4, further comprising displaying a third web service query result interface in response to selection of the third selectable input associated with the third discovered web service, wherein the third web service query result interface includes information retrieved in response to execution of the third discovered web service based on the text search term received via the text entry element of the modified database query interface.

6. The computer-implemented method of claim 4, wherein the third discovered web service includes a product owner lookup service, wherein the web service input associated with the product owner lookup service includes a product name input that is associated with a product name logical field of the data abstraction model via the discovery registry, and wherein the web service output associated with the product owner lookup service includes a list of employee identifiers that are associated with an employee identification logical field of the data abstraction model via the discovery registry.

7. The computer-implemented method of claim 1, wherein the first discovered web service includes a department lookup service, wherein the web service input associated with the department lookup service includes a department identification input that is associated with an employee department code logical field of the data abstraction model via the discovery registry, and wherein the web service output associated with the department lookup service includes a list of employee identifiers that are associated with an employee identification logical field of the data abstraction model via the discovery registry.

8. The computer-implemented method of claim 1, wherein the second discovered web service includes a support lookup service, wherein the web service input associated with the support lookup service includes a support e-mail input that is associated with an employee e-mail address logical field of the data abstraction model via the discovery registry, and wherein the web service output associated with the support lookup service includes a list of employee identifiers that are associated with an employee identification logical field of the data abstraction model via the discovery registry.

9. The computer-implemented method of claim 1, further comprising receiving the text search term via the text entry element of the modified database query interface.

10. A system, comprising:
a processor;
an interface to receive a selection of a particular logical field via a database query interface; and
a computer readable storage medium configured to store:
  a data abstraction model of a database, wherein the data abstraction model includes a plurality of logical fields, wherein each logical field of the plurality of logical fields corresponds to a particular data structure of the database;
  a discovery registry associated with the data abstraction model of the database, wherein the discovery registry associates a plurality of web services with a plurality of logical fields of the data abstraction model;
  a resolver executable by the processor to query the discovery registry to discover at least a first web service and a second web service of the plurality of web services that are resolvable based on the particular logical field that is received via the database query interface, wherein a web service input of the first discovered web service is associated with a first logical field of the data abstraction model via the discovery registry, wherein a web service output of the first discovered web service is associated with a second logical field of the data abstraction model via the discovery registry, wherein a web service input of the second discovered web service is associated with a third logical field of the data abstraction model via the discovery registry, and wherein a web service output of the second discovered web service is associated with the second logical field of the data abstraction model via the discovery registry; and
  a user interface component executable by the processor to:
    modify the database query interface to include a text entry element to receive a text search term, a first selectable input associated with the first discovered web service, and a second selectable input associated with the second discovered web service, and
    display a modified database query interface that includes the text entry element to receive the text search term, the first selectable input associated with the first discovered web service, and the second selectable input associated with the second discovered web service.

11. The system of claim 10, wherein the computer readable storage medium is further configured to store the database.

12. The system of claim 10, wherein the resolver is a structured query language (SQL) condition function resolver.

13. The system of claim 10, wherein the computer readable storage medium is further configured to store a web registry, wherein the web registry includes discoverable information associated with the plurality of web services.

14. The system of claim 13, wherein the discoverable information associated with a particular web service of the plurality of web services is stored at the discovery registry upon addition of the particular web service to the web registry.

15. The system of claim 10, wherein the user interface component is further operable to display a first web service query result interface in response to selection of the first selectable input associated with the first discovered web service, wherein the first web service query result interface includes information retrieved in response to execution of the first discovered web service based on the text search term received via the text entry element of the modified database query interface.

16. The system of claim 10, wherein the user interface component is further operable to display a second web service query result interface in response to selection of the second selectable input associated with the second discovered web service, wherein the second web service query result interface includes information retrieved in response to execution of the second discovered web service based on the text search term received via the text entry element of the modified database query interface.

17. A computer readable storage medium comprising instructions, that when executed by a processor, cause the processor to:
receive a selection of a particular logical field via a database query interface;
query a discovery registry associated with a data abstraction model of a database to discover at least a first web service and a second web service that are resolvable based on the particular logical field that is received via the database query interface, wherein the data abstraction model includes a plurality of logical fields, wherein each logical field of the plurality of logical fields corresponds to a particular data structure of the database, wherein a web service input of the first discovered web service is associated with a first logical field of the data abstraction model via the discovery registry, wherein a web service output of the first discovered web service is associated with a second logical field of the data abstraction model via the discovery registry, wherein a web service input of the second discovered web service is associated with a third logical field of the data abstraction model via the discovery registry, and wherein a web service output of the second discovered web service is associated with the second logical field of the data abstraction model via the discovery registry;
modify the database query interface to include a text entry element to receive a text search term, a first selectable input associated with the first discovered web service, and a second selectable input associated with the second discovered web service; and
display a modified database query interface that includes the text entry element to receive the text search term, the first selectable input associated with the first discovered web service, and the second selectable input associated with the second discovered web service.

18. The computer readable storage medium of claim 17, further comprising instructions, that when executed by the processor, cause the processor to:
- display a first web service query result interface in response to selection of the first selectable input associated with the first discovered web service, wherein the first web service query result interface includes information retrieved in response to execution of the first discovered web service based on the text search term received via the text entry element of the modified database query interface; and
- display a second web service query result interface in response to selection of the second selectable input associated with the second discovered web service, wherein the second web service query result interface includes information retrieved in response to execution of the second discovered web service based on the text search term received via the text entry element of the modified database query interface.

19. The computer readable storage medium of claim 18, wherein the database query interface includes a first graphical user interface (GUI), wherein the modified database query interface includes a second GUI, wherein the first web service query result interface includes a third GUI, and wherein the second web service query result interface includes a fourth GUI.

20. The computer readable storage medium of claim 17, further comprising instructions, that when executed by the processor, cause the processor to:
- remove the first selectable input associated with the first discovered web service from the modified database query interface in response to user selection of a first removal option; and
- remove the second selectable input associated with the second discovered web service from the modified database query interface in response to user selection of a second removal option.

* * * * *